(12) United States Patent
Presna

(10) Patent No.: US 11,254,244 B1
(45) Date of Patent: Feb. 22, 2022

(54) BABY CAR SEAT TRACK SYSTEM

(71) Applicant: Pierre-Richard Presna, Bridgeport, CT (US)

(72) Inventor: Pierre-Richard Presna, Bridgeport, CT (US)

(*) Notice: Subject to any disclaimer, the term of this patent is extended or adjusted under 35 U.S.C. 154(b) by 0 days.

(21) Appl. No.: 17/196,190

(22) Filed: Mar. 9, 2021

(51) Int. Cl.
*B60N 2/28* (2006.01)
*B60N 2/06* (2006.01)
*B60N 2/07* (2006.01)
*B60N 2/075* (2006.01)

(52) U.S. Cl.
CPC ........... *B60N 2/2869* (2013.01); *B60N 2/062* (2013.01); *B60N 2/071* (2013.01); *B60N 2/075* (2013.01); *B60N 2/0737* (2013.01)

(58) Field of Classification Search
CPC .... B60N 2/062; B60N 2/2869; B60N 2/0737; B60N 2/071; B60N 2/075
USPC ..................................................... 297/256.12
See application file for complete search history.

(56) References Cited

U.S. PATENT DOCUMENTS

| | | | | |
|---|---|---|---|---|
| 6,572,189 B1 * | 6/2003 | Blaymore | ............ | B60N 2/2806 |
| | | | | 297/256.1 |
| 6,773,065 B1 * | 8/2004 | Stamper | ................ | A47D 5/006 |
| | | | | 297/250.1 |
| 7,753,444 B2 * | 7/2010 | Vallentin | .............. | B60N 2/2893 |
| | | | | 297/256.12 |
| 7,891,721 B2 * | 2/2011 | Pesach | .................. | B60N 2/286 |
| | | | | 296/65.11 |
| 8,702,169 B2 * | 4/2014 | Abadilla | ................ | B60N 2/062 |
| | | | | 297/256.12 |
| 10,449,876 B2 * | 10/2019 | Lonstein | .............. | B60N 2/2812 |
| 10,730,413 B1 * | 8/2020 | Riad | ...................... | B60N 2/062 |
| 2009/0026819 A1 * | 1/2009 | Zahar | .................. | B60N 2/2806 |
| | | | | 297/256.16 |
| 2015/0258921 A1 * | 9/2015 | Chung | .................. | B60N 2/286 |
| | | | | 297/256.16 |

FOREIGN PATENT DOCUMENTS

| | | | | |
|---|---|---|---|---|
| DE | 102015010363 A1 * | 3/2016 | .......... | B60N 2/2806 |
| WO | WO-0121433 A1 * | 3/2001 | ............. | B60N 2/062 |

* cited by examiner

*Primary Examiner* — Milton Nelson, Jr.
(74) *Attorney, Agent, or Firm* — Kyle A. Fletcher, Esq.

(57) ABSTRACT

The baby car seat track system comprises a track, a seat adapter, and a child seat. The baby car seat track system may be operable to couple the child seat to a vehicle seat in a vehicle. The track may be embedded within the vehicle seat running laterally across the vehicle seat and accessible via a crevice of the vehicle seat. The seat adapter may couple the child seat to the track such that the child seat may be repositioned laterally on the vehicle seat and may rotate around a vertical axis. The baby car seat track system may be adapted to make a child more accessible to a user by repositioning and rotating the child seat within the vehicle.

18 Claims, 6 Drawing Sheets

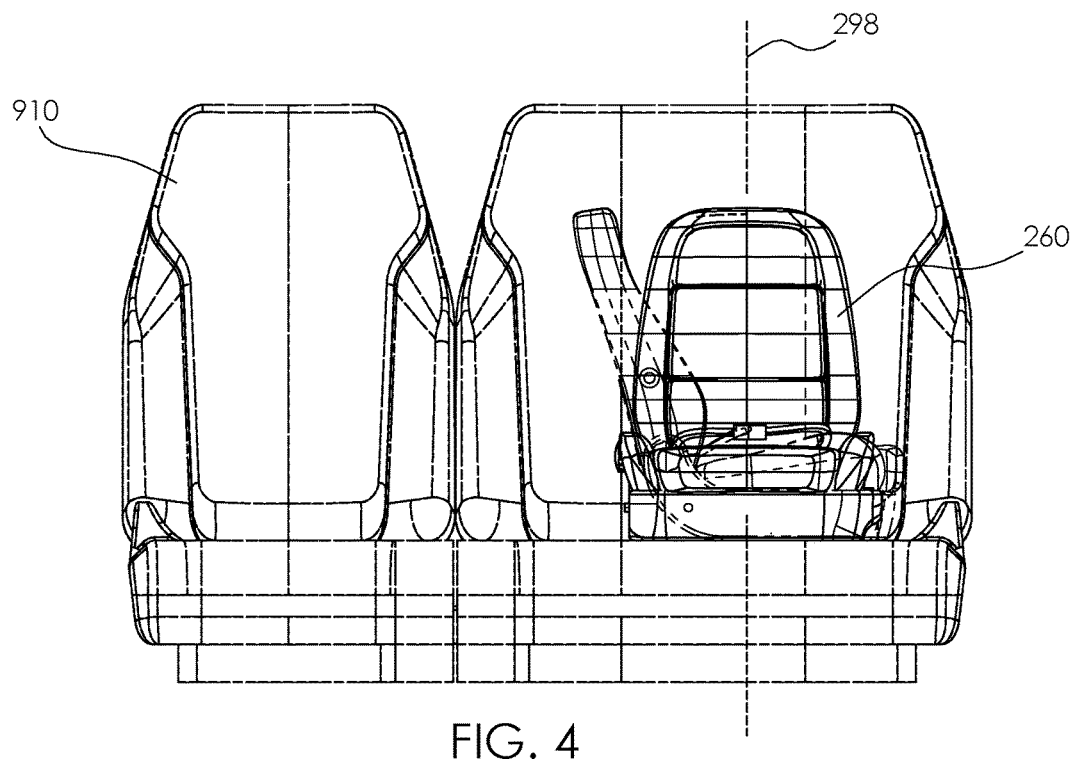
FIG. 4
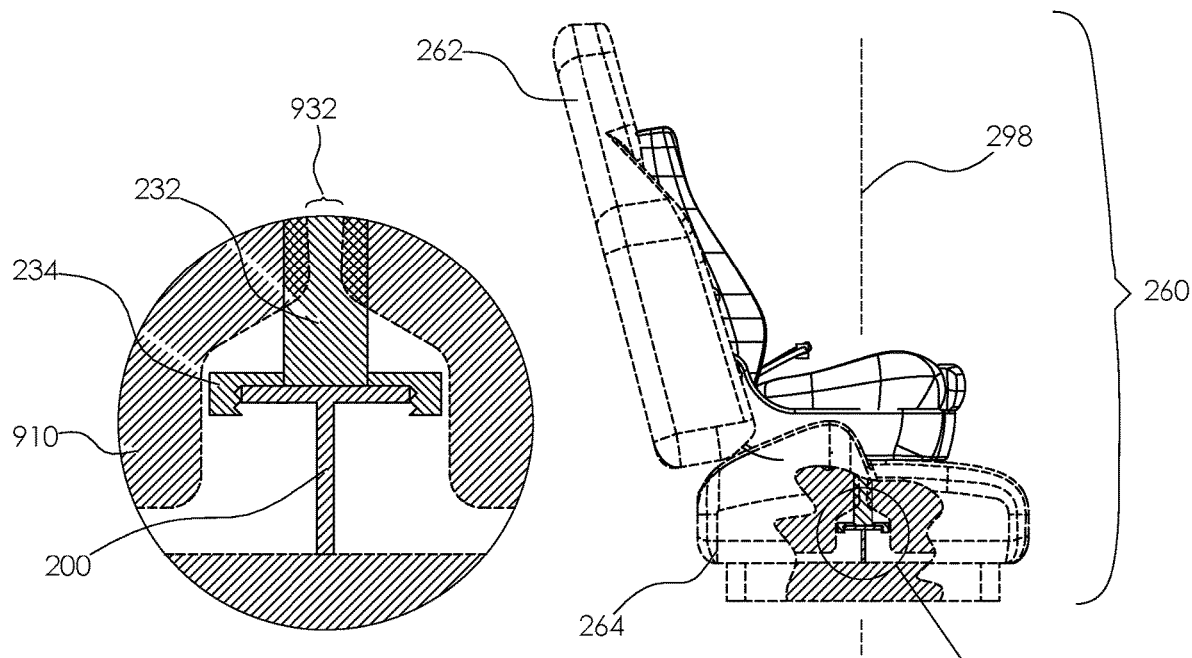
FIG. 5A
FIG. 5

BABY CAR SEAT TRACK SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of child car seats, more specifically, a baby car seat track system.

SUMMARY OF INVENTION

The baby car seat track system comprises a track, a seat adapter, and a child seat. The baby car seat track system may be operable to couple the child seat to a vehicle seat in a vehicle. The track may be embedded within the vehicle seat running laterally across the vehicle seat and accessible via a crevice of the vehicle seat. The seat adapter may couple the child seat to the track such that the child seat may be repositioned laterally on the vehicle seat and may rotate around a vertical axis. The baby car seat track system may be adapted to make a child more accessible to a user by repositioning and rotating the child seat within the vehicle.

An object of the invention is to provide a child car seat for use in a vehicle.

Another object of the invention is slidably couple the car seat to a track via a seat adapter.

A further object of the invention is to provide a track within the car seat such that the car seat may be moved from side-to-side within the vehicle by sliding the car seat and car seat adapter along the track.

Yet another object of the invention is to rotate the car seat around a vertical axis extending upwards from the seat adapter such that the car seat is made more accessible.

These together with additional objects, features and advantages of the baby car seat track system will be readily apparent to those of ordinary skill in the art upon reading the following detailed description of the presently preferred, but nonetheless illustrative, embodiments when taken in conjunction with the accompanying drawings.

In this respect, before explaining the current embodiments of the baby car seat track system in detail, it is to be understood that the baby car seat track system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the baby car seat track system.

It is therefore important that the claims be regarded as including such equivalent construction insofar as they do not depart from the spirit and scope of the baby car seat track system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a front view of an embodiment of the disclosure illustrating the rotation of the car seat above the vehicle seat.

FIG. 5 is a side view of an embodiment of the disclosure illustrating the car seat.

FIG. 5A is a detail view of an embodiment of the disclosure illustrating the area designate 5A in FIG. 5.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
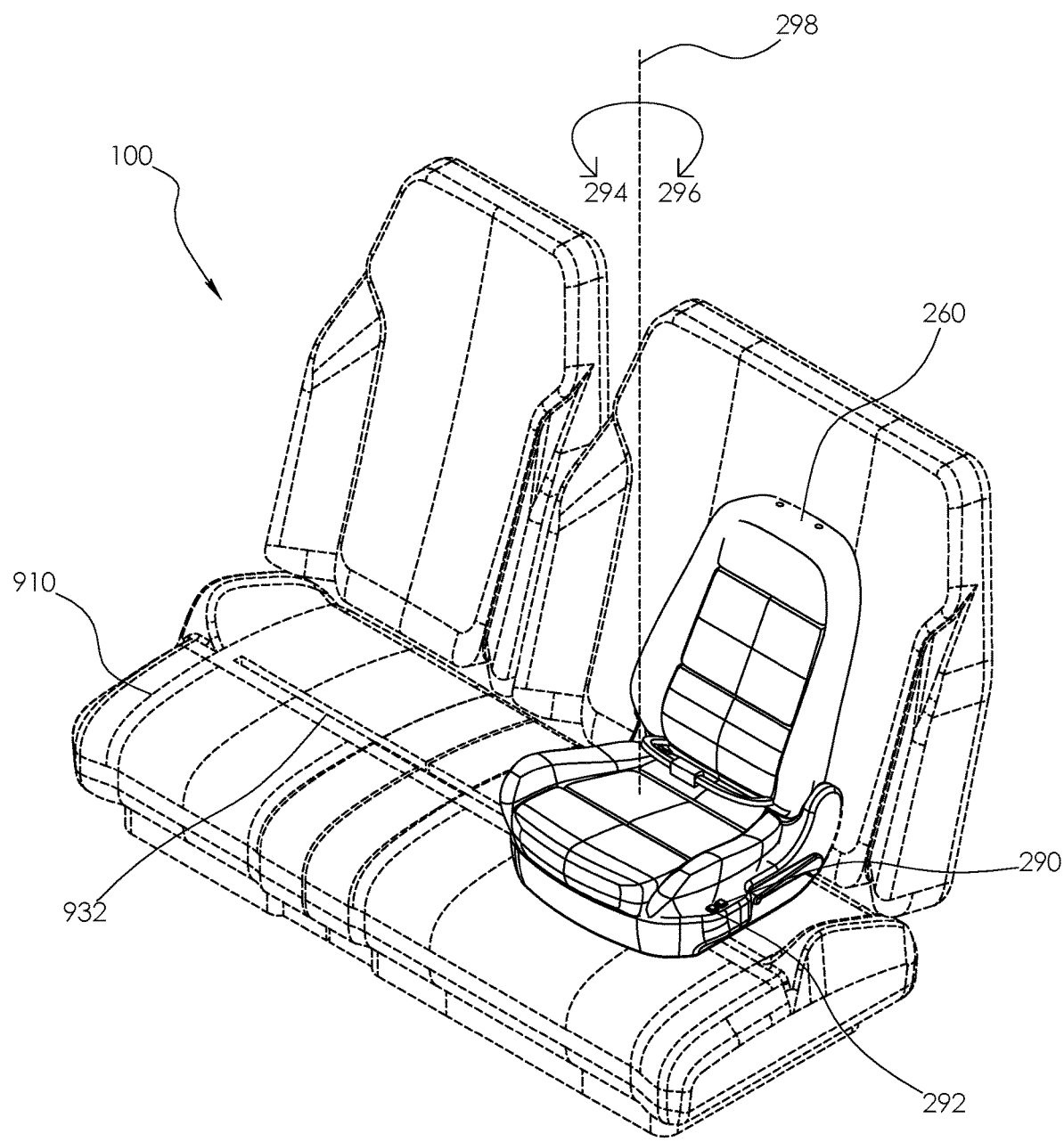
FIG. 1 is an isometric view of an embodiment of the disclosure.
Figure 2:
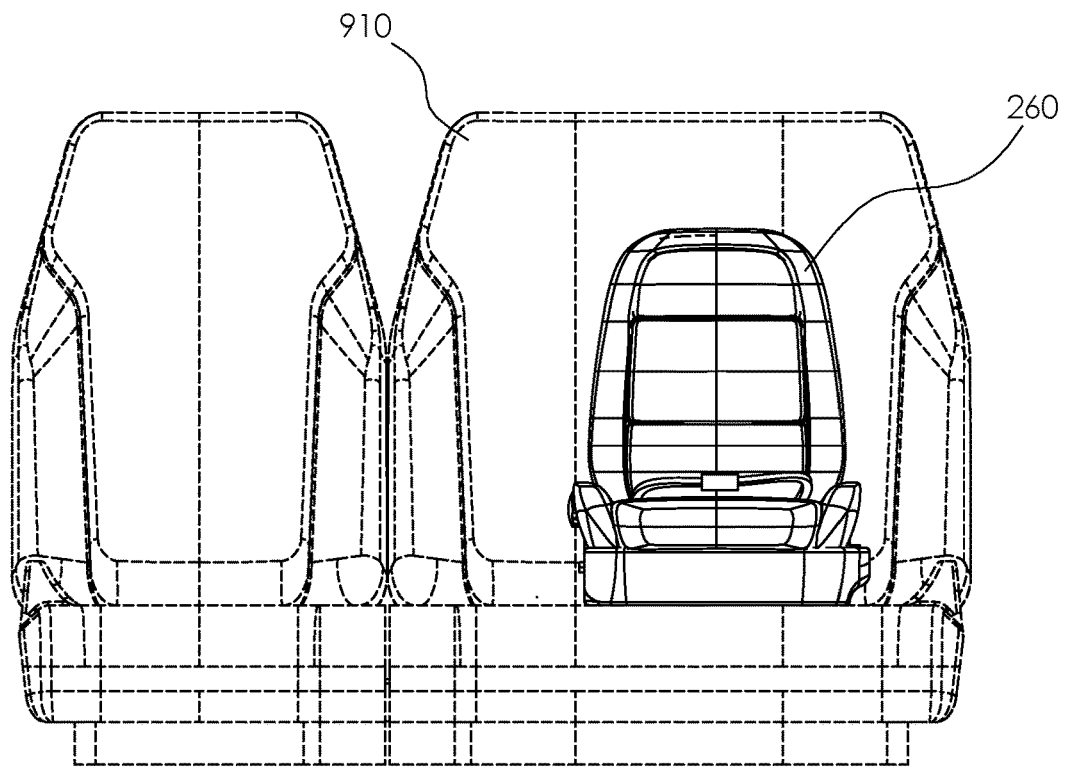
FIG. 2 is a front view of an embodiment of the disclosure.
Figure 3:
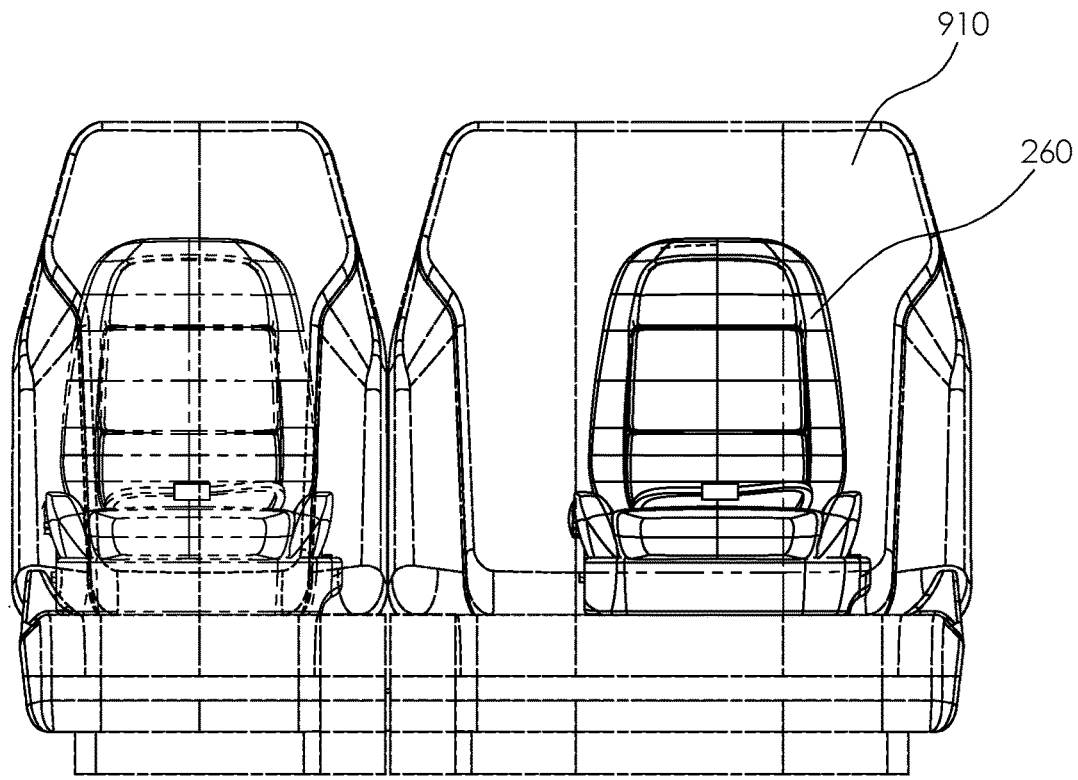
FIG. 3 is a front view of an embodiment of the disclosure illustrating the repositioning of the car seat laterally within the vehicle.
Figure 6:
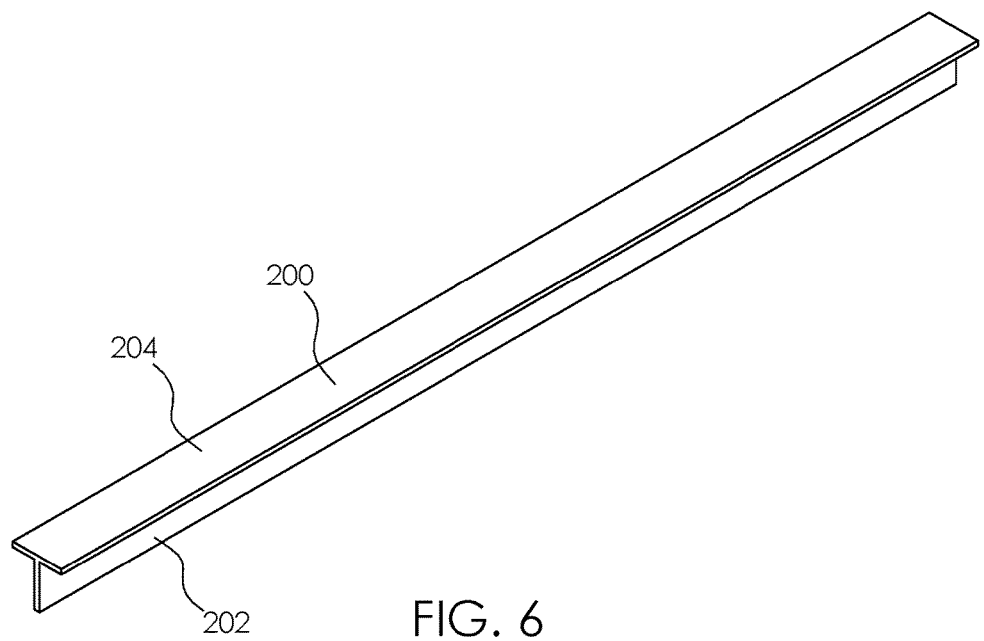
FIG. 6 is an isometric view of an embodiment of the disclosure illustrating the track.
Figure 7:
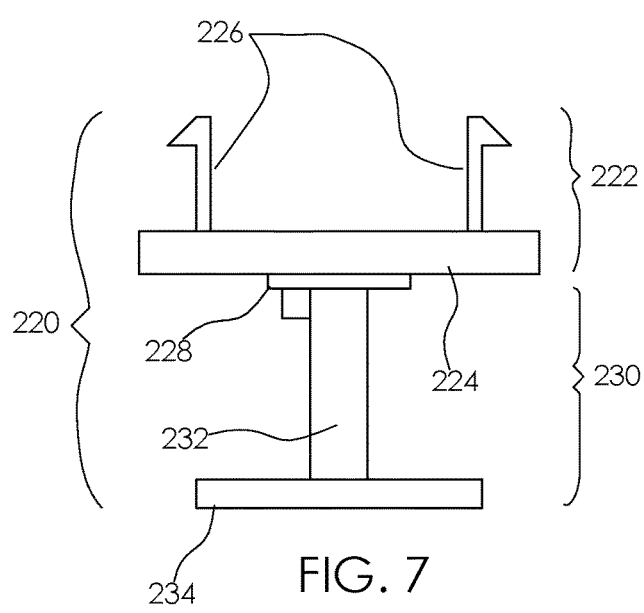
FIG. 7 is a front view of an embodiment of the disclosure illustrating the seat adapter.
Figure 8:
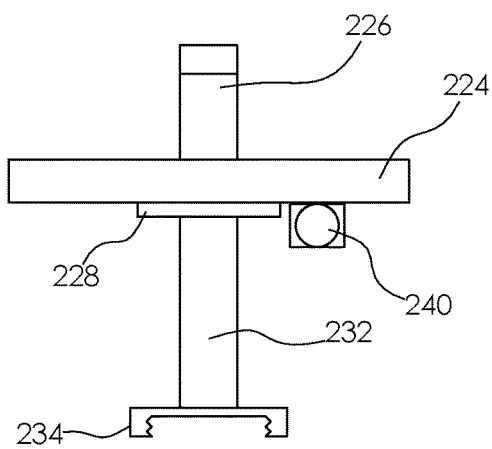
FIG. 8 is a side view of an embodiment of the disclosure illustrating the seat adapter.
Figure 9:
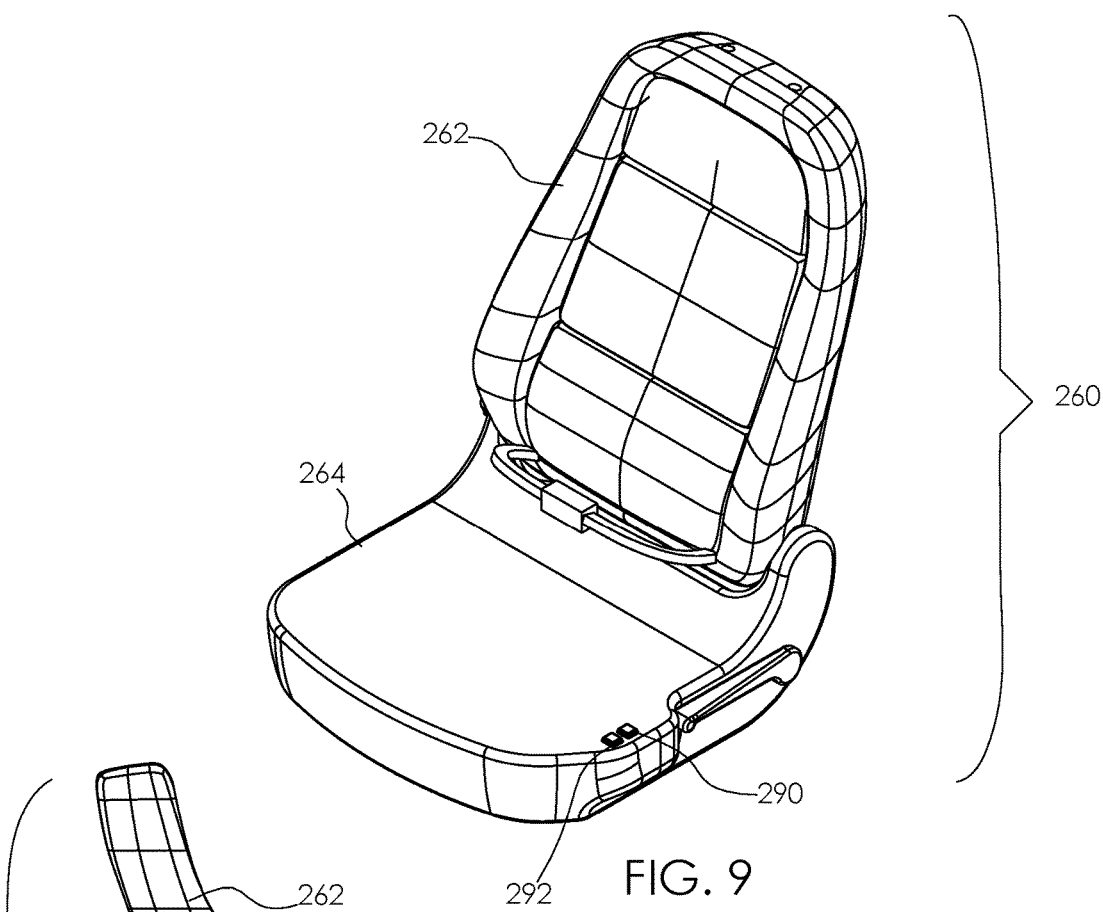
FIG. 9 is an isometric view of an embodiment of the disclosure illustrating the car seat.
Figure 10:
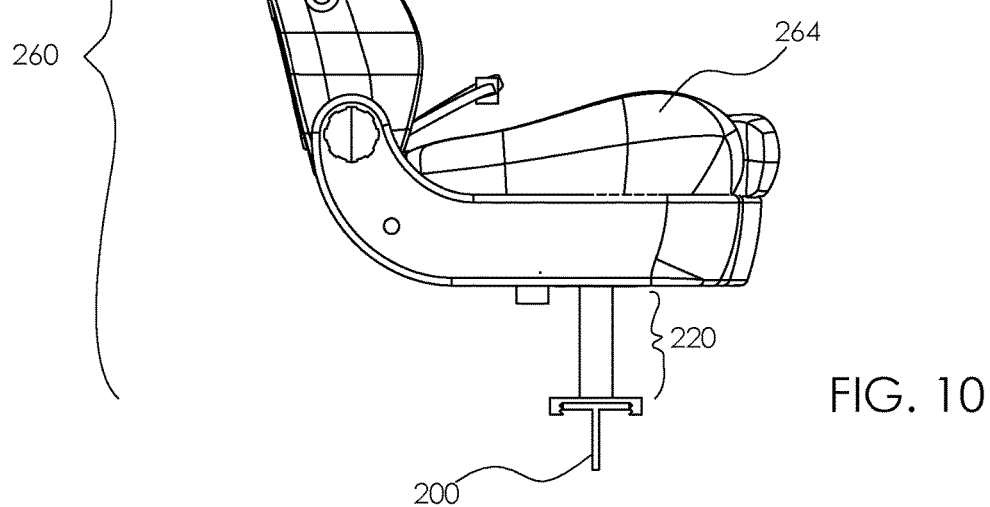
FIG. 10 is a side view of an embodiment of the disclosure illustrating the car seat.
Figure 11:
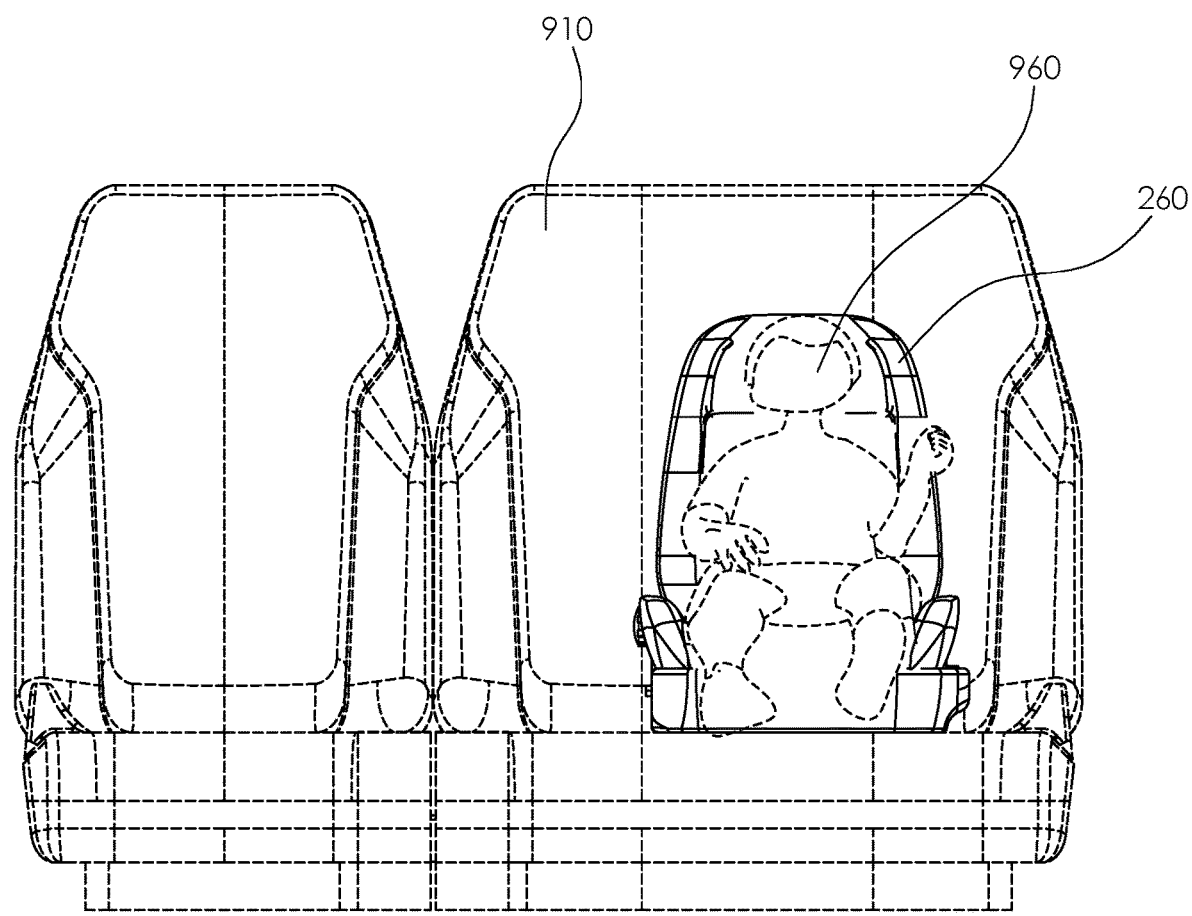
FIG. 11 is an in-use view of an embodiment of the discourse.

Detailed reference will now be made to a first potential embodiment of the disclosure, which is illustrated in FIGS. 1 through 11.

The baby car seat track system 100 (hereinafter invention) comprises a track 200, a seat adapter 220, and a child seat 260. The invention 100 may be operable to couple the child seat 260 to a vehicle seat 910 in a vehicle. The track 200 may be embedded within the vehicle seat 910 running laterally across the vehicle seat 910 and accessible via a crevice 932 of the vehicle seat 910. The seat adapter 220 may couple the child seat 260 to the track 200 such that the child seat 260 may be repositioned laterally on the vehicle seat 910 and may rotate around a vertical axis 298. The invention 100 may be adapted to make a child 960 more accessible to a user by repositioning and rotating the child seat 260 within the vehicle.

The track 200 may be a T-shaped armature comprising a flange plate 204 and a web plate 202. The flange plate 204 may be horizontally oriented and located at the top of the track 200. The web plate 202 may be vertically oriented with the top of the web plate 202 coupled to the bottom center of the flange plate 204. The bottom of the web plate 202 may be coupled to the vehicle. As a non-limiting example, the bottom of the web plate 202 may be coupled to a vehicle frame.

The track 200 may be accessible via the crevice 932 located in the vehicle seat 910 and oriented laterally with respect to the vehicle. The crevice 932 may be located directly above the track 200 for the width of the vehicle seat 910 such that the seat adapter 220 may slide along the track 200 while exposed above the vehicle seat 910.

The seat adapter 220 may comprise a car seat dock 222, a track interface 230, a swivel joint 228, and a servo motor 240. The seat adapter 220 may couple the child seat 260 to the track 200 such that the child seat 260 may slide along the track 200. In some embodiments, the child seat 260 may detach from the track 200 by sliding the seat adapter 220 onto and off of the track 200 from a lateral side of the vehicle seat 910.

The car seat dock 222 may couple to the bottom of the child seat 260. The car seat dock 222 may comprise a dock plate 224 and a pair of seat clips 226. The dock plate 224 may be a horizontally oriented plate. The pair of seat clips 226 may extend upward from the top surface of the dock plate 224. The pair of seat clips 226 may engage the bottom of the child seat 260 such that the seat adapter 220 couples to the child seat 260. The swivel joint 228 may couple to the bottom center of the dock plate 224.

The seat adapter 220 may be prevented from sliding along the track 200 unless a first operator control 290 is activated. The first operator control 290 may be located on the child seat 260 where the first operator control 290 may be adapted to be accessible to the user. As a non-limiting example, when the first operator control 290 is not activated friction between the seat adapter 220 and the track 200 may prevent the seat adapter 220 from sliding along the track 200 and when the first operator control 290 is activated a mechanical cable may remove the source of friction such that the seat adapter 220 may slide along the track 200.

The track interface 230 may slidably couple to the track 200 such that the seat adapter 220 may slide along the track 200. The track interface 230 may comprise a bracket 234 and a post 232. The bracket 234 may be a C-shaped armature. The bracket 234 may grasp the track 200 such that the bracket 234 may slide laterally within the vehicle along the track 200. The bracket 234 may comprise one or more features that prevent the bracket 234 from being lifted straight up off of the track 200. As non-limiting examples, the bracket 234 may comprise fingers that extend beneath the flange plate 204 of the track 200 or the bracket 234 may comprise longitudinally ribbed inside edges that engage a set of similarly ribbed edges on the flange plate 204.

The post 232 may be a vertically oriented armature that extends the height of the seat adapter 220 such that the seat adapter 220 may pass through the crevice 932 of the vehicle seat 910. The top of the post 232 may couple to the bottom center of the swivel joint 228. The bottom of the post 232 may couple to the top center of the bracket 234.

The swivel joint 228 may pivotably couple the car seat dock 222 to the track interface 230 such that the car seat dock 222 may rotate around the vertical axis 298 while the track interface 230 remains coupled to the track 200.

The servo motor 240 may rotate the car seat dock 222 relative to the track interface 230 when energized by a second operator control 292. Rotation of the car seat dock 222 may cause a corresponding rotation of the child seat 260. The servo motor 240 may be energized by applying an electrical potential from a vehicle battery via the second operator control 292. The servo motor 240 may rotate the car seat dock 222 in a first rotational direction 294 when the electrical potential applied to the servo motor 240 comprises a first electrical polarity. The servo motor 240 may rotate the car seat dock 222 in a second rotational direction 296 when the electrical potential applied to the servo motor 240 comprises a second electrical polarity. The second operator control 292 may be activated such that the electrical potential applied to the servo motor 240 comprises the first electrical polarity or the second electrical polarity.

The child seat 260 may comprise a seat back 262 and a seat base 264. The seat base 264 may be adapted for the child 960 to sit upon. The seat back 262 may be adapted for the child 960 to lean against. The child seat 260, in conjunction with one or more restraints within the vehicle, may be adapted to retain the child 960 within the child seat 260 in the event of an accident involving the vehicle.

In use, the user may slide the child seat 260 towards a door of the vehicle by activating the first operator control 290 to release the seat adapter 220 from the track 200 and by sliding the child seat 260 towards the door. The user may rotate the child seat 260 to face the door by activating the second operator control 292. The user may place the child 960 into the child seat 260 and rotate the child seat 260 to face the front using the second operator control 292. The user may slide the child seat 260 laterally to a desired position by activating the first operator control 290 and by sliding the child seat 260 over the vehicle seat 910. The user may fasten the one or more restraints to retain the child 960. The child 960 may be removed from the child seat 260 by reversing this process.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the word "child" may include anyone who might ride in a car safety seat and specifically includes newborns, infants, toddlers, and small children.

As used in this disclosure, the word "correspond" indicates that a first object is in some manner linked to a second object in a one to one relationship or that one or more properties shared by two or more objects match, agree, or align within acceptable manufacturing tolerances.

As used herein, the words "couple", "couples", "coupled" or "coupling", may refer to connecting, either directly or indirectly, and does not necessarily imply a mechanical connection.

As used herein, the word "desired" may refer to a specific value or action within a range of supported values or action. A "desired" value or action may indicate that a range of values or actions is enabled by the invention and that a user of the invention may select a specific value or action within the supported range of values or action based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, a "flange" may be a protruding rib, edge, or collar that is used to hold an object in place or to attach a first object to a second object.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the word "lateral" may refer to the sides of an object or movement towards a side. Lateral directions are generally perpendicular to longitudinal directions. "Laterally" may refer to movement in a lateral direction.

As used herein, the word "longitudinal" or "longitudinally" may refer to a lengthwise or longest direction.

As used in this disclosure, a "motor" may refer to a device that transforms energy from an external power source into mechanical energy.

As used in this disclosure, a "plate" may be a flat, rigid object having at least one dimension that is of uniform thickness and is thinner than the other dimensions of the object. Plates often have a rectangular or disk like appearance. Plates may be made of any material, but are commonly made of metal.

As used in this disclosure, a "track" may be a device that is used to control the path of motion of an object in at least one dimension.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 11, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A baby car seat track system comprising:
   a track, a seat adapter, a vehicle seat of a vehicle, and a child seat;
   wherein the baby car seat track system is operable to couple the child seat to the vehicle seat in said vehicle;
   wherein the track is embedded within the vehicle seat running laterally across the vehicle seat and accessible via a crevice of the vehicle seat;
   wherein the seat adapter couples the child seat to the track such that the child seat is repositioned laterally on the vehicle seat and rotates around a vertical axis;
   wherein the baby car seat track system is adapted to make a child more accessible to a user by repositioning and rotating the child seat within the vehicle;
   wherein the track is a T-shaped armature comprising a flange plate and a web plate;
   wherein the flange plate is horizontally oriented and located at the top of the track.

2. The baby car seat track system according to claim 1
   wherein the web plate is vertically oriented with the top of the web plate coupled to the bottom center of the flange plate;
   wherein the bottom of the web plate is coupled to the vehicle.

3. The baby car seat track system according to claim 2
   wherein the bottom of the web plate is coupled to a vehicle frame.

4. The baby car seat track system according to claim 3
   wherein the track is accessible via the crevice located in the vehicle seat and oriented laterally with respect to the vehicle;
   wherein the crevice is located directly above the track for the width of the vehicle seat such that the seat adapter slides along the track while exposed above the vehicle seat.

5. The baby car seat track system according to claim 4
   wherein the seat adapter comprises a car seat dock, a track interface, a swivel joint, and a servo motor;
   wherein the seat adapter couples the child seat to the track such that the child seat slides along the track.

6. The baby car seat track system according to claim 5
   wherein the child seat detaches from the track by sliding the seat adapter onto and off of the track from a lateral side of the vehicle seat.

7. The baby car seat track system according to claim 5
   wherein the car seat dock couples to the bottom of the child seat;
   wherein the car seat dock comprises a dock plate and a pair of seat clips.

8. The baby car seat track system according to claim 7
   wherein the dock plate is a horizontally oriented plate;
   wherein the pair of seat clips extend upward from the top surface of the dock plate;
   wherein the pair of seat clips engages the bottom of the child seat such that the seat adapter couples to the child seat.

9. The baby car seat track system according to claim 8 wherein the swivel joint couples to the bottom center of the dock plate.

10. The baby car seat track system according to claim 9 wherein the seat adapter is prevented from sliding along the track unless a first operator control is activated;
wherein the first operator control is located on the child seat where the first operator control is adapted to be accessible to the user.

11. The baby car seat track system according to claim 10 wherein when the first operator control is not activated friction between the seat adapter and the track prevent the seat adapter from sliding along the track;
wherein when the first operator control is activated a mechanical cable removes the source of friction such that the seat adapter slides along the track.

12. The baby car seat track system according to claim 10 wherein the track interface slidably couples to the track such that the seat adapter slides along the track;
wherein the track interface comprises a bracket and a post.

13. The baby car seat track system according to claim 12 wherein the bracket is a C-shaped armature;
wherein the bracket grasps the track such that the bracket slides laterally within the vehicle along the track;
wherein the bracket comprises one or more features that prevent the bracket from being lifted straight up off of the track.

14. The baby car seat track system according to claim 13 wherein the post is a vertically oriented armature that extends the height of the seat adapter such that the seat adapter passes through the crevice of the vehicle seat;
wherein the top of the post couples to the bottom center of the swivel joint;
wherein the bottom of the post couples to the top center of the bracket.

15. The baby car seat track system according to claim 14 wherein the swivel joint pivotably couples the car seat dock to the track interface such that the car seat dock rotates around the vertical axis while the track interface remains coupled to the track.

16. The baby car seat track system according to claim 15 wherein the servo motor is operable to rotate the car seat dock relative to the track interface when energized by a second operator control;
wherein rotation of the car seat dock causes a corresponding rotation of the child seat.

17. The baby car seat track system according to claim 16 wherein the servo motor is energized by applying an electrical potential from a vehicle battery via the second operator control;
wherein the servo motor is operable to rotate the car seat dock in a first rotational direction when the electrical potential applied to the servo motor comprises a first electrical polarity;
wherein the servo motor is operable to rotate the car seat dock in a second rotational direction when the electrical potential applied to the servo motor comprises a second electrical polarity;
wherein the second operator control is activated such that the electrical potential applied to the servo motor comprises the first electrical polarity or the second electrical polarity.

18. The baby car seat track system according to claim 17 wherein the child seat comprises a seat back and a seat base;
wherein the seat base is adapted for the child to sit upon;
wherein the seat back is adapted for the child to lean against;
wherein the child seat, in conjunction with one or more restraints within the vehicle, is adapted to retain the child within the child seat in the event of an accident involving the vehicle.

* * * * *